Nov. 24, 1936.  F. SPURRIER  2,061,857
OVERHEAD RAIL
Filed July 14, 1934
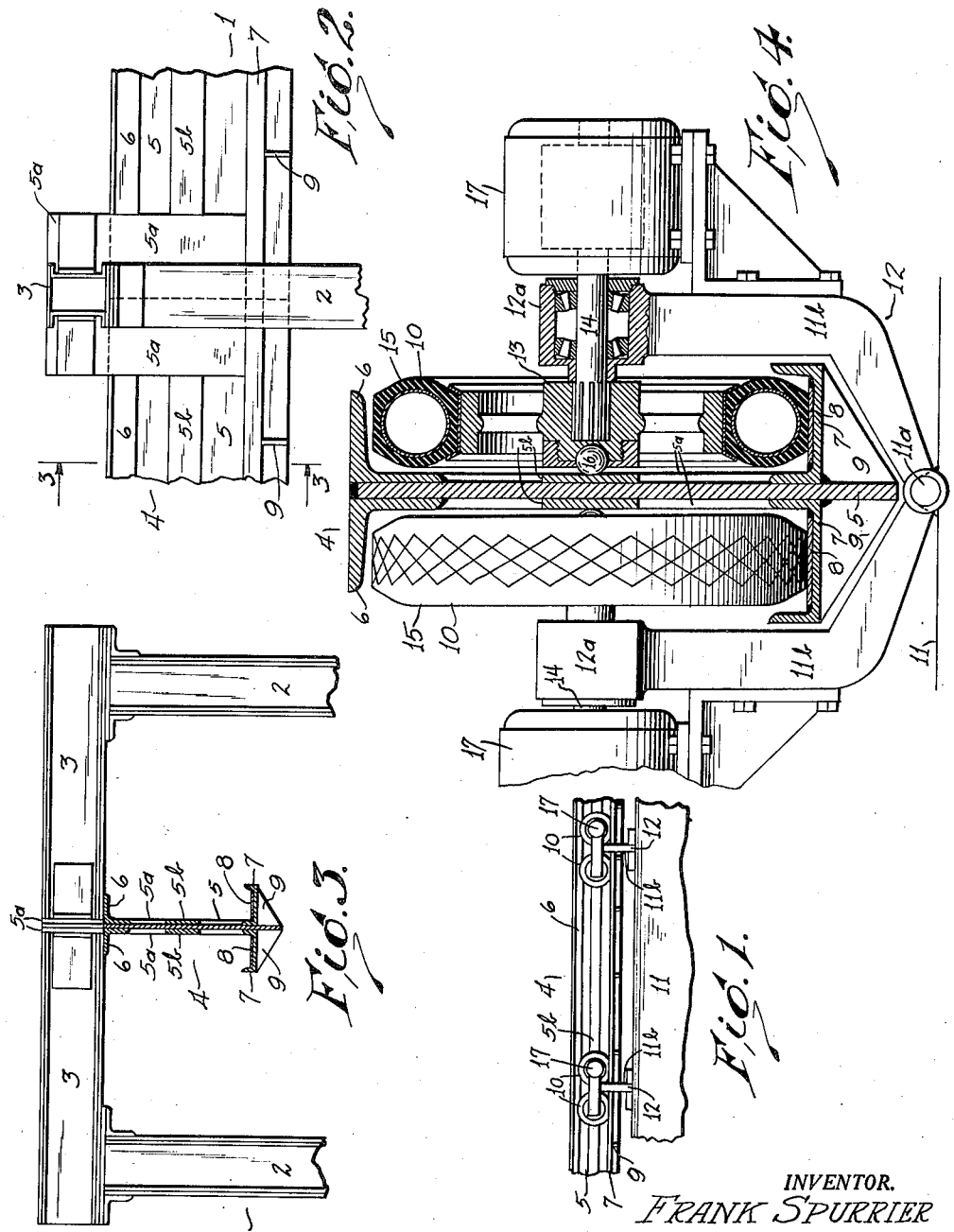
INVENTOR.
FRANK SPURRIER
BY Munn, Anderson & Liddy
ATTORNEYS.

Patented Nov. 24, 1936

2,061,857

UNITED STATES PATENT OFFICE 2,061,857

OVERHEAD RAIL

Frank Spurrier, Berkeley, Calif.

Application July 14, 1934, Serial No. 735,268

5 Claims. (Cl. 104—93)

My invention relates to improvements in overhead rails, and it consists of the combinations, constructions and arrangements hereinafter described and claimed.

An object of my invention is to provide an overhead rail which is carried by a rail-supporting structure so that the rail itself is suspended above the ground or supporting surface. The rail comprises a web supported by the structure and in turn the web carries two channel-shaped tracks, these being disposed at opposite sides of the web or partition and being secured thereto.

The vehicle carried by the overhead rail has wheel trucks and wheels with preferably rubber tires are mounted on the trucks, and these wheels ride in the tracks. This arrangement provides a noiseless support for the vehicle or car, and the rubber tires aid in the riding qualities, and also in the speed of the device. The rubber tires may be solid or pneumatic if desired. It is obvious that the tracks could be provided with rubber wear plates and that the wheels could then be provided with either metal or rubber tires.

Any means for propelling the car along the rail may be used, either by a direct or geared drive to the wheels, or by the provision of a propeller for moving the device along the rails. Novel means is also provided for preventing lateral movement of the wheel trucks with respect to the rail.

Other objects and advantages will appear in the following specification, and the novel features of the device will be particularly pointed out in the appended claims.

My invention is illustrated in the accompanying drawing forming a part of this application, in which Figure 1 is a side elevation of a car shown suspended by wheel-supported trucks, the wheels in turn riding on the overhead rail;

Figure 2 is a side elevation of a part of the structure supporting the overhead rail;

Figure 3 is a section along the line 3—3 of Figure 2; and

Figure 4 is a view of one of the carriage-supporting trucks, parts being shown in section.

In carrying out my invention I provide a structure indicated generally at 1, and having supporting legs 2 and cross pieces 3. The overhead rail is shown at 4, and the web 5 of the rail is secured to the cross pieces 3 by supporting members 5a. The supporting structure may have its parts riveted or welded together.

The exact construction of the overhead rail is more clearly indicated in Figure 4, and it will be noted that the web or partition 5 carries angle irons 6 at its top for reinforcing the web, and channel irons 7 adjacent to its bottom. The channels may be welded to the web and the web welded to the supporting structure if desired.

The channel irons 7 are disposed on opposite sides of the web and constitute tracks and may be provided with wear plates 8 that can be renewed from time to time. In this way the channel irons themselves are protected. Reinforcing triangular members 9 are also shown in Figure 4, and these are secured to the web 5 and support the channel irons 7. The wear plates 8 can be made either of rubber or metal. The web 5 can be of lattice construction if desired to lighten the weight. The channel irons may be perforated at intervals to permit drainage of water which may collect.

The overhead rail just described provides a double track for the wheels indicated generally at 10, of a vehicle or car 11. The car 11, or a number of similar cars forming a train, can be passenger or freight cars. The wheels 10 support wheel trucks 12 and the wheel trucks in turn carry the car 11. It will be noted that in Figure 4 I show the car 11 pivoted at 11a to the truck arms 11b. This permits the car to hang in one position at all times.

In Figure 4 I show a sectional view through one of the wheels, and it will be noted that the hub 13 of the wheel is splined to a shaft 14, which in turn is rotatably mounted in a journal 12a of the wheel truck 12. The journal 12a has roller bearings. The wheel 10 is shown as being provided with a pneumatic tire 15 although it is to be clearly understood that a solid rubber tire can be used in place of the pneumatic one. Metal-tired wheels running on rubber wear plates 8 could also be used.

In order to prevent side swaying, or excessive lateral movement of the wheel truck with respect to the overhead rail 4, I mount a large ball bearing 16 in the hub 13, and this ball bearing rides against a guide strip 5b. Figure 2 shows how the guide strips 5b extend between the supporting plates 5a and with these plates provide a continuous smooth surface for the ball bearings 16.

The wheels 10 are mounted in pairs, and the axes of each pair of wheels coincide with one another so that the ball bearings 16 will be aligned. The ball bearings will permit slight vertical movement of the wheels, and also will permit forward movement of the car 11 along the track, but will prevent excessive lateral movement of the wheel truck 12 with respect to the overhead rail.

Any means for propelling the car along the track may be used. I have shown an electric motor 17 mounted on the wheel truck 12 and directly connected to the shaft 14. The motor will rotate the wheel 10 by means of the shaft 14. A second motor 17 is also operatively connected to the second wheel 10 and is supported by the same wheel truck 12. In this way both of the wheels 10 are drive wheels. As many drive wheels 10 as desired may be used, and these drive wheels are preferably mounted in pairs so that the motors 17 will balance each other. Any other type of drive for the car may be used without departing from the spirit and scope of my invention. If desired the power unit may be built into or within the body of the car and in this way reduce resistance to air when the car is in motion.

From the foregoing description of the various parts of the device, the operation thereof may be readily understood.

The device is designed for high speed travel and for noiseless travel. The rubber tires permit a high speed, and at the same time afford comfort to the passengers in that noise is eliminated, and a spring-like suspension for the car 11 is provided. The channels 7 prevent the wheels from riding off the track. As already stated the large ball bearings 16 provided on the hubs of each wheel contact with opposite faces of the guide strips 5b and hold the car against lateral swaying. The particular construction of the overhead rail is novel and also the combination of the overhead rail and the particular construction of the wheel truck is novel. The device is extremely simple in construction and is durable and efficient for the purpose intended.

While I have shown only the preferred form of my invention, it should be understood that various changes or modifications may be made within the scope of the appended claims without departing from the spirit of the invention.

I claim:

1. In combination, a supporting web, tracks mounted on both sides of the lower portion of the web and being supported thereby, yielding wheels mounted on the tracks and arranged in pairs, a truck supported by the wheels, the axes of each pair of wheels being aligned, and means carried by the wheels and bearing against the web for reducing lateral movement of the wheels with respect to the web while still permitting the yielding wheels to act as a buoyant support for the truck.

2. In combination, an overhead rail having a track divided into two parts by a central upstanding web, yielding wheels mounted on both sides of the divided track, truck sections supported by the wheels and being interconnected below the track, and ball bearings carried by the wheels and bearing against opposite sides of the web for reducing lateral movement of the wheels with respect to the track while still permitting the yielding wheels to act as a buoyant support for the truck sections.

3. In combination, an overhead rail including a central web and tracks mounted along both sides of the web, a wheel truck straddling the tracks, supporting wheels on the truck movable along the tracks, guide strips extending lengthwise of the web on opposing sides of the latter, bearing members on confronting sides of the wheels mounted for running movement on the strips to prevent lateral shifting of the wheel truck relative to the rail, and means for moving the truck along the rail.

4. In combination, an overhead rail including a web and tracks mounted on both sides of the web, a wheel truck, pneumatically tired wheels supporting the truck and being movable on the tracks, propelling means supported by the truck and being directly connected to the wheels, said wheels and propelling means being aligned for balancing the truck, and a car attached to the truck, and means bearing against the web for preventing lateral movement of the truck with respect to the rail while still permitting the truck to be buoyantly supported by the pneumatic tired wheels.

5. In combination, an overhead rail including a web and tracks mounted on both sides of the web, a wheel truck straddling the tracks, axles rotatably carried by the truck and being disposed on both sides of the web, said axles being aligned with each other, power units carried by the truck and being directly connected to the axles, pneumatically tired wheels mounted on said axles and riding on the tracks, and a ball bearing mounted at the center of each wheel and bearing against the web for preventing lateral movement of the truck with respect to the rail while still permitting the truck to be buoyantly supported by the pneumatically tired wheels.

FRANK SPURRIER.